(12) United States Patent
Everett

(10) Patent No.: US 9,117,213 B2
(45) Date of Patent: Aug. 25, 2015

(54) ELECTRONIC TRANSACTION RISK MANAGEMENT

(75) Inventor: David Everett, Rustington (GB)

(73) Assignee: ROYAL CANADIAN MINT, Ottawa (CA)

( * ) Notice: Subject to any disclaimer, the term of this patent is extended or adjusted under 35 U.S.C. 154(b) by 0 days.

(21) Appl. No.: 13/360,241

(22) Filed: Jan. 27, 2012

(65) Prior Publication Data

US 2012/0198550 A1     Aug. 2, 2012

Related U.S. Application Data

(60) Provisional application No. 61/437,153, filed on Jan. 28, 2011.

(51) Int. Cl.
| | | |
|---|---|---|
| *G06F 21/00* | (2013.01) | |
| *G06F 15/16* | (2006.01) | |
| *G06Q 20/40* | (2012.01) | |
| *G06F 21/64* | (2013.01) | |

(52) U.S. Cl.
CPC .......... *G06Q 20/4016* (2013.01); *G06F 21/64* (2013.01); *G06F 2221/2101* (2013.01)

(58) Field of Classification Search
CPC ........... G06F 2221/2101; G06F 21/64; G06Q 20/4016
See application file for complete search history.

(56) References Cited

U.S. PATENT DOCUMENTS

| | | | |
|---|---|---|---|
| 4,511,970 A * | 4/1985 | Okano et al. ................. | 705/41 |
| 4,731,842 A * | 3/1988 | Smith ............................ | 705/71 |
| 5,461,217 A * | 10/1995 | Claus ........................... | 235/380 |
| 5,615,268 A * | 3/1997 | Bisbee et al. ................. | 713/176 |
| 5,903,652 A * | 5/1999 | Mital ............................ | 705/78 |
| 6,282,522 B1 * | 8/2001 | Davis et al. .................. | 705/41 |
| 6,286,098 B1 * | 9/2001 | Wenig et al. ................. | 713/151 |
| 6,370,517 B2 * | 4/2002 | Yanagihara et al. .......... | 705/41 |
| 6,947,908 B1 * | 9/2005 | Slater ........................... | 705/51 |
| 7,113,925 B2 * | 9/2006 | Waserstein et al. .......... | 705/50 |
| 7,143,290 B1 * | 11/2006 | Ginter et al. ................. | 713/176 |
| 7,398,249 B2 * | 7/2008 | Repak .......................... | 705/39 |
| 7,822,688 B2 * | 10/2010 | Labrou et al. ................ | 705/67 |
| 8,768,842 B2 * | 7/2014 | Aissi ............................ | 705/50 |
| 8,924,287 B1 * | 12/2014 | Gailloux et al. ............. | 705/39 |
| 2002/0023053 A1 * | 2/2002 | Szoc et al. ................... | 705/39 |
| 2004/0155101 A1 * | 8/2004 | Royer et al. ................. | 235/379 |
| 2005/0125342 A1 * | 6/2005 | Schiff .......................... | 705/39 |
| 2006/0229961 A1 * | 10/2006 | Lyftogt et al. ............... | 705/35 |
| 2007/0255652 A1 * | 11/2007 | Tumminaro et al. ......... | 705/39 |
| 2009/0018964 A1 * | 1/2009 | Liu et al. ..................... | 705/76 |
| 2010/0133337 A1 * | 6/2010 | Van Rensburg .............. | 235/380 |

FOREIGN PATENT DOCUMENTS

WO   PCT/CA2010/000435    3/2010
WO   PCT/CA2010/001434    9/2010

* cited by examiner

*Primary Examiner* — Jung Kim
*Assistant Examiner* — James J Wilcox
(74) *Attorney, Agent, or Firm* — Pearne & Gordon LLP

(57) ABSTRACT

A method of detecting unauthorized activity in an electronic message transfer system comprising a plurality of devices, each device being configured to generate and receive cryptographically secured transfer messages for exchanging content with other devices in the system. In each device, audit information is accumulated in a memory of the device. The device periodically forwards at least part of its accumulated audit information to a secure server.

10 Claims, 2 Drawing Sheets

ELECTRONIC TRANSACTION RISK MANAGEMENT

CROSS-REFERENCE TO RELATED APPLICATIONS

This application is based on, and claims benefit of, U.S. provisional patent application No. 61/147,153 filed Jan. 28, 2011, the entire content of which is hereby incorporated herein by reference.

MICROFICHE APPENDIX

Not Applicable.

TECHNICAL FIELD

The present disclosure relates to electronic transaction systems, and in particular to a system and methods for managing risks associated with electronic transactions within an un-trusted environment.

BACKGROUND

For the purpose of the present description, an "untrusted environment" shall be understood to mean any communications or networking environment in which it is possible for attackers to modify messages, delete messages or even add or replay messages. The public Internet is a common example of an untrusted environment, since it is not possible to prohibit attackers from modifying, deleting, adding or duplicating messages.

For the purposes of the present description, a "sensitive transaction" shall be understood to refer to any message exchange or communications session between two or more parties, in which it is desired that message content(s) should be reliably transferred between the parties, and be secure against unauthorized viewing and/or manipulation. Examples of "sensitive transactions" include, but are not limited to: financial transactions such as electronic funds transfers and eCommerce; remote sensing and telemetry data transfer messaging; and electronic voting schemes.

Internet-based electronic transaction systems are well known in the art. In order to mitigate risks associated with sensitive transactions in an un-trusted environment such as the Internet, such systems typically employ a secure server, which acts as an intermediary between parties to any electronic transaction. In some cases, the secure server merely serves to authenticate the parties. More commonly, the secure server both authenticates the parties and controls the actual funds transfer. As a result, the secure server is able to provide both parties with confidence that the transaction has been completed properly, and also enables the server to generate a detailed audit trail, by which the service provider can detect fraudulent or otherwise inappropriate use of the system by any party. A limitation of this arrangement is that the requirement for users to log into the central server in order to perform any transaction, is inconvenient, and thus so limits user acceptance of the system.

Various schemes have been proposed which are intended to enable electronic person-to-person financial transactions in a manner that is directly analogous to fiat cash transactions, in that the intervention of a central server to mediate the transfer of funds is not used. A central theme of such systems is the provision of security mechanisms that provide at least the same level of security and trustworthiness that is afforded by conventional central server-based systems, but without the inconvenience of requiring the parties to log into a central server. However, these systems suffer a limitation in that, because a user may log into a central server infrequently (or even never), there is no reliable mechanism by which a service provider can build an audit trail that would permit the detection of fraudulent or otherwise inappropriate activity.

SUMMARY

Accordingly, the present invention sets out to provide a practical way of overcoming the above limitations of the prior art.

Accordingly, an aspect of the present invention provides a method of detecting unauthorized activity in an electronic message transfer system comprising a plurality of devices, each device being configured to generate and receive cryptographically secured value transfer messages for exchanging amounts monetary value with other devices in the system. In each device, audit information is accumulated in a memory of the device. The device periodically forwards at least part of its accumulated audit information to a secure server.

BRIEF DESCRIPTION OF THE DRAWINGS

Further features and advantages will become apparent from the following detailed description, taken in combination with the appended drawings, in which.

It will be noted that throughout the appended drawings, like features are identified by like reference numerals.

DETAILED DESCRIPTION

It is anticipated that users (subscribers) of an online service that enables sensitive transactions will be required to indicate their acceptance of a published set of terms and conditions, as a condition of their use of the system. Among other things, these terms and conditions will set out limitations in the proper use of the service, including, for example, that the user agrees to not use the service for illegal or unethical purposes.

Upon acceptance of the terms and conditions, the user may be provided with an electronic storage and transfer device generally of the type described in Applicant's co-pending international patent applications Nos. PCT/CA2010/000435 filed Mar. 30, 2010 and PCT/CA2010/001434 filed Sep. 17, 2010, both of which designate the United States of America, the disclosures of both of which are incorporated herein by reference.

Figure 1:
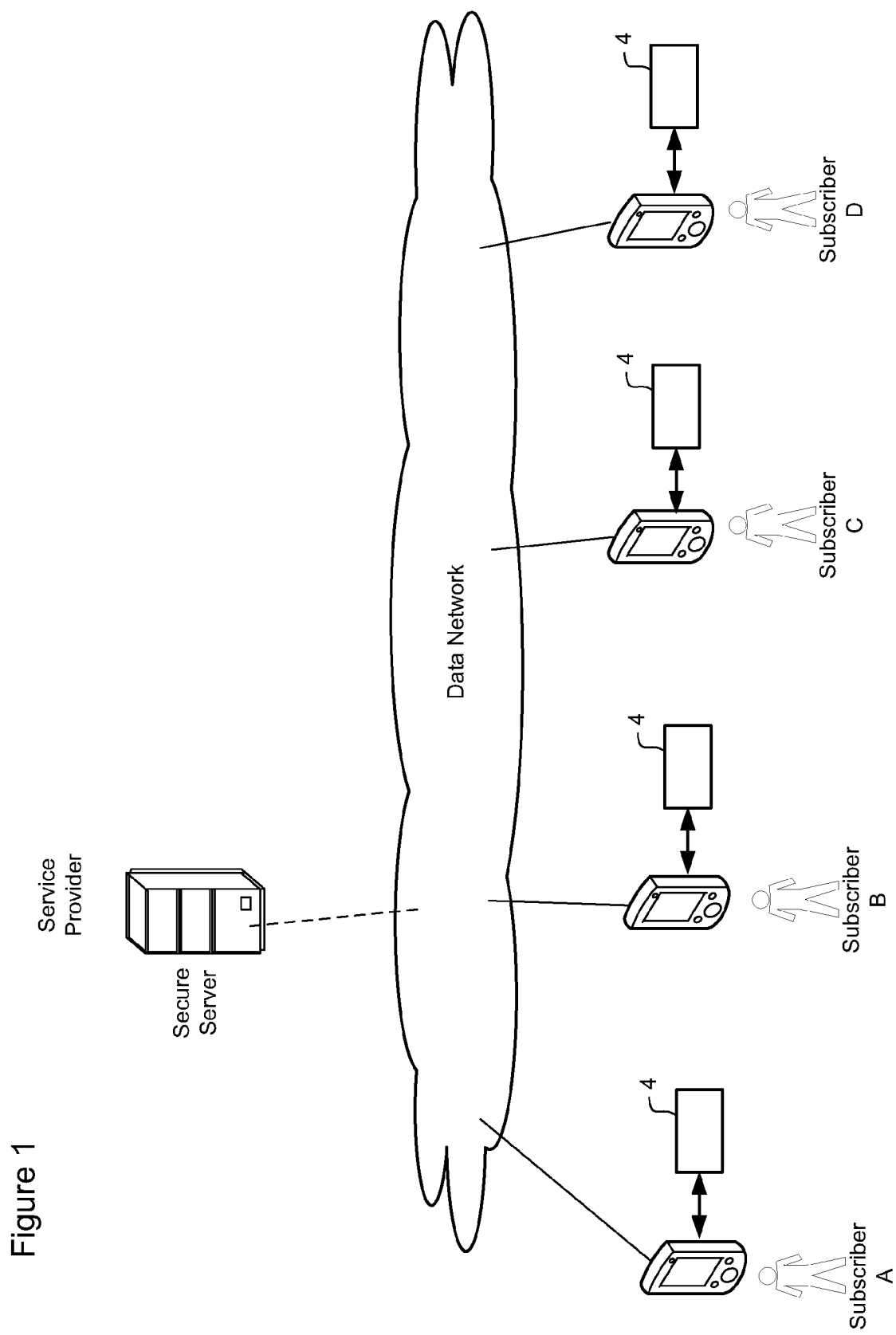
FIG. 1 is a block diagram schematically illustrating a secure message exchange system in which methods in accordance with the present invention may be implemented.
Figure 2:
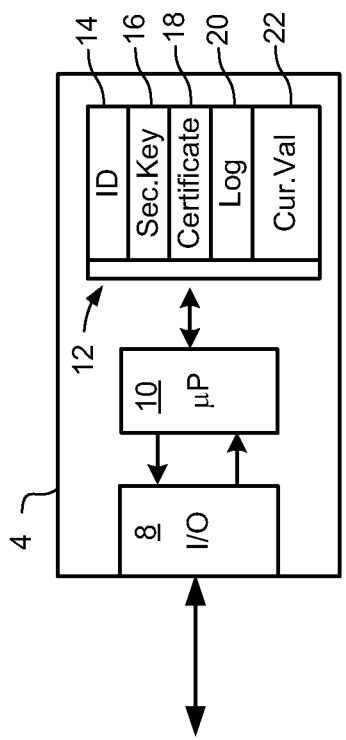
FIG. 2 is a block diagram schematically illustrating a subscriber's communications device, usable in the system of FIG. 1.

Referring to FIG. 2, as described in PCT/CA2010/001434, the storage and transfer device 4 comprises an input/output (I/O) interface 8 configured to enable the device 4 to send and receive messages through the communications medium 6; a controller 10 responsive to received messages to record transfers of content to the device 4 and to transfer content from the device 4; and a memory 12 storing a respective unique identifier 14 of the device 4, a private (or secret) key 16 and a certificate 18 uniquely assigned to the device 4, a log 20 of content transfers to and from the device 4, and a current content (Cur.Val) 22 of the device 44. As described in PCT/

CA2010/000435, the controller 10, memory 12 and encryption/decryption functions of the device 4 may be implemented within a single Application Specific Integrated Circuit (ASIC), and the device 4 may be designed in a form factor of the type known from removable memory devices (including, but not limited to Memory-Stick™, and so-called "thumb-drive" devices) of computers and digital cameras. Other suitable form-factors may be used, as desired, including smart cards and key-fobs, for example.

The secret key 16 and a certificate 18, facilitate message encryption and digital signature functionality using, for example, well-known Public Key Infrastructure (PKI) techniques. For this purpose, the secret key 16 can be securely generated by the storage and transfer device 4 and the certificate 18 would typically be generated by a trusted Issuing Authority, such as, for example, Verisign™.

As described in PCT/CA2010/001434, in a "transfer-out process", the device 4, operates to generate a cryptographically secured content (asset value) transfer message containing the content to be transferred, a nonce for enabling detection and proper handling of duplicate messages, a digital signature generated using the secret key 16, and the certificate 18. With this information, a receiving device 4 can execute a "transfer-in" process in which the certificate can be used to verify the digital signature, and so detect any corruption of the message during transport through the network, detect (and discard) duplicate messages by the use of protected sequencing or equivalent identifying information in the message, and finally update its current content (Cur.Val) 22 with the content conveyed in the message. In addition, the processor 10 can record information about each transfer-in and transfer-out in the log 20. Among other things, the log may be accessed by the user to obtain a record of transactions.

It is anticipated that the device 4 may be constructed in two variants. In a first variant, the device 4 is constructed as a physical device suitable for distribution to and use by an individual person. In a second variant, the device 4 is constructed as server configured to emulate a desired number of physical storage devices allocated to individual users. In this latter case, a user may access their device 4 by means of suitable application software stored on a communications device. In principle, the log can be used to construct an audit trail (at least in respect of the particular device) and so could be used to detect non-compliant use of the device 4. However, in practice, it is possible for a user to use their device 4 to engage in person-to-person financial transactions without logging in to a central server that could access the log 20 to obtain the required transaction information. In this situation, it is possible that the service provider might never be able to ensure that the system is free from abuse.

The following three strategies may be employed for addressing this problem.

1. Encoding utilization limits into the firmware of the processor 10. Such utilization limits can take any of a variety of different forms, depending on the type of data stored in the memory 12, either within the log 20 or in other data storage fields (not shown) provided in the memory 12 for that purpose. For example, utilization limits based on an accumulated amount of asset value transferred, or a total number of transactions can be readily defined. Other utilization limits may also be defined, as desired. In operation, when the utilization limit has been reached, the processor 10 may reject any further requests to transfer content in to, or out of the device 4, until the user either logs in to a central server and resets their device 4, or alternatively contacts the service provider to exchange their device 4 for a Previously Presented one. In either scenario, the service provider is enabled to access the memory 12 of the device 4, and thereby detect non-compliant use of the device 4.

2. Encoding transaction limits into the firmware of the processor 10. A representative transaction limit may, for example, take the form of a maximum content amount (such as, for example, a monetary amount) that can be transferred in any given transfer message. If the transaction limit is exceeded, the processor 10 may issue a notification to the user requesting that they log onto a central server to obtain authorization for the transaction. Here again, once the user completes the log on procedure, the secure server can access and analyze all or part of the data stored in the memory 12, and thereby detect non-compliant use of the device 4.

Figure 3:
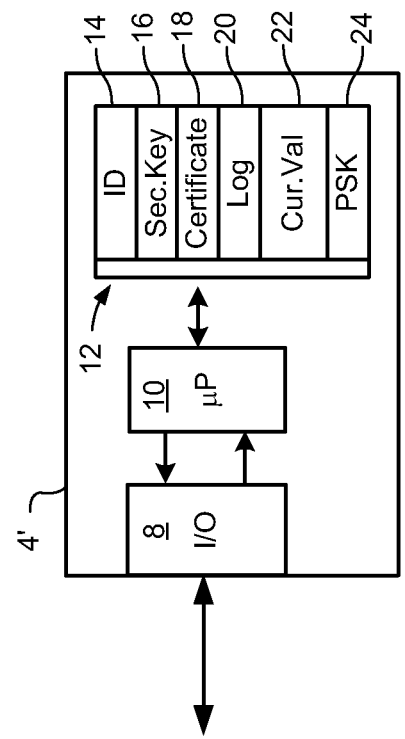
FIG. 3 is a block diagram of a diagram schematically illustrating an alternative subscriber's communications device, usable in the system of FIG. 1.

3. Configuring the firmware of the processor 10 to embed encrypted audit information in each content transfer message, for example within a predefined field of the message. The audit information may comprise data stored in the memory 12 (or be derived from such stored data), that can be analysed to detect unauthorized or otherwise non-compliant use of the device 4. This audit information may, for example, include an accumulated amount of asset value transferred, or a total number of transactions, as well as any of a variety of possible fault codes that could be generated by the processor 10 during operation. Such fault codes could, for example, comprise a total number of transfer-in or transfer-out processes that were not successfully completed. Other audit information may be defined as desired and accumulated in the memory 12 for inclusion in content transfer messages. In order to ensure secure encryption of the audit information, a provider's secret key (PSK) 24 (see FIG. 3) that is known only to the service provider may be installed in the device 4.

During each transfer-out process, the processor 10 can extract the audit information from the memory 12, encrypt it using the PSK 24, and attach the encrypted audit information to the content transfer message prior to applying the digital signature (based on the user's Secret key 16) and certificate 18. With this arrangement, the digital signature encompasses the encrypted audit information, so that attempts to fraudulently manipulate the encrypted audit information can be detected (and result in failure of the transaction). Encryption of the audit information using a Provider's Secret Key (PSK) 24 separate from the user's secret key 16 ensures that the recipient of any content transfer messages (with the sole exception of the service provider itself) will be unable to access and read the audit information.

The embedding of encrypted audit information in each content transfer message enables the service provider to enter into specific service agreements with selected parties (such as, for example, on-line merchants) whereby each party agrees to forward a copy of some (or all) received content transfer messages to the service provider. Upon receipt of these copied messages, the service provider can decrypt and analyse the embedded audit information. It is anticipated that, by entering into appropriate agreements with on-line merchants (and other parties who may be expected to interact with a large number of individual users), the service provider will receive copies of a significant portion (although likely not all) of the asset transfer messages being exchanged between all users of the system. Consequently, the service provider can analyse the decrypted audit information to detect unauthorized activities, as well as derive statistically valid metrics regarding the status of the system as a whole.

The embodiment(s) of the invention described above is(are) intended to be exemplary only. The scope of the invention is therefore intended to be limited solely by the scope of the appended claims.

I claim:

1. A method of detecting unauthorized activity in an electronic message transfer system comprising a plurality of storage and transfer devices associated with respective users of the electronic message transfer system, each storage and transfer device being configured to generate and receive cryptographically secured transfer messages for exchanging content with other storage and transfer devices in the system, the method comprising:

each storage and transfer device:
  accumulating audit information in a memory of the storage and transfer device, the accumulated audit information comprising audit information relating to a plurality of transfer messages generated or received by the storage and transfer device; and
  embedding encrypted audit information in each transfer message generated by the storage and transfer device, the embedded encrypted audit information comprising encrypted audit information relating to at least two transfer messages generated or received by the storage and transfer device, the encrypted audit information being encrypted using a first key that is different from a second key used to cryptographically secure the transfer message; and
at least one of the plurality of storage and transfer devices receiving cryptographically secured transfer messages and forwarding copies of the received cryptographically secured transfer messages to a secure server configured to decrypt and analyse the audit information embedded in each received cryptographically secured transfer message to detect unauthorized activity;
wherein each storage and transfer device comprises an Application Specific Integrated Circuit (ASIC) configured to implement the memory and a processor of the storage and transfer device.

2. The method of claim 1, further comprising:
at least one storage and transfer device detecting a predetermined condition; and
in response to the detected condition, the at least one storage and transfer device notifying a user of the storage and transfer device to contact a service provider to reset the storage and transfer device, wherein during a subsequent reset operation, at least part of the accumulated audit information is forwarded to the secure server.

3. The method of claim 2, wherein the predetermined condition is selected from the list of: an accumulated number of transactions; an accumulated value of funds exchanged with other devices; a limit value of funds transferred in any single transaction; a limit value of funds stored in the device.

4. The method of claim 1, wherein the first key is unknown to a user of the storage and transfer device.

5. The method of claim 1, wherein encrypted audit information is embedded in the transfer message before the transfer message is cryptographically secured using the second key, such that subsequent alteration of the audit information embedded within the cryptographically secured transfer message can be detected.

6. An electronic message transfer system comprising:
a plurality of storage and transfer devices associated with respective users of the electronic message transfer system, each storage and transfer device being configured to generate and receive cryptographically secured transfer messages for exchanging content with other storage and transfer devices in the system, each storage and transfer device comprising an Application Specific Integrated Circuit (ASIC) implementing:
  a memory configured to accumulate audit information relating to a plurality of transfer messages generated or received by the storage and transfer device; and
  a processor configured to embed encrypted audit information in each transfer message generated by the storage and transfer device, the embedded encrypted audit information comprising encrypted audit information relating to at least two transfer messages generated or received by the storage and transfer device the encrypted audit information being encrypted using a first key that is different from a second key used to cryptographically secure the transfer message; and
at least one of the plurality of storage and transfer devices being configured to receive cryptographically secured transfer messages and forwarding copies of the received cryptographically secured transfer messages to a secure server configured to decrypt and analyse the audit information embedded in each received cryptographically secured transfer message to detect unauthorized activity.

7. The system of claim 6, wherein at least one storage and transfer device is configured to:
detect a predetermined condition; and
in response to the detected condition, notify a user of the storage and transfer device to contact a service provider to reset the storage and transfer device, wherein during a subsequent reset operation, at least part of the accumulated audit information is forwarded to the secure server.

8. The system of claim 7, wherein the predetermined condition is selected from the list of: an accumulated number of transactions; an accumulated value of funds exchanged with other devices; a limit value of funds transferred in any single transaction; a limit value of funds stored in the storage and transfer device.

9. The system of claim 6, wherein the first key is unknown to the user of the storage and transfer device.

10. The system of claim 6, wherein encrypted audit information is embedded in the transfer message before the transfer message is cryptographically secured using the second key, such that subsequent alteration of the audit information embedded within the cryptographically secured transfer message can be detected.

* * * * *